(No Model.) 4 Sheets—Sheet 2.
J. W. FROST.
ANNUNCIATOR AND ALARM SIGNAL.
No. 354,856. Patented Dec. 21, 1886.

(No Model.) 4 Sheets—Sheet 3.

J. W. FROST.
ANNUNCIATOR AND ALARM SIGNAL.

No. 354,856. Patented Dec. 21, 1886.

Attest:
C. B. Nash,
H. B. Knight

Inventor:
J. W. Frost,
By E. B. Whitmore,
Atty.

UNITED STATES PATENT OFFICE.

JOSEPH W. FROST, OF ROCHESTER, NEW YORK.

ANNUNCIATOR AND ALARM-SIGNAL.

SPECIFICATION forming part of Letters Patent No. 354,856, dated December 21, 1886.

Application filed March 11, 1886. Serial No. 194,898. (No model.)

*To all whom it may concern:*

Be it known that I, JOSEPH W. FROST, of Rochester, in the county of Monroe and State of New York, have invented a new and useful Improvement in a Combined Electrical Annunciator and Alarm-Signal, which improvement is fully set forth in the following specification, and shown in the accompanying drawings.

In electric systems for announcing and preventing fires there are used, in addition to the battery and current-conductors, devices such as annunciators, alarm-bells, signal or trip boxes, &c.; and the object of my present invention is to combine an improved annunciator and signal-box with testing circuit-closers in a compact form.

Heretofore circuit-breaking wheels and similar circuit-breaking devices have been employed in combination with circuit-closers; but the relative location of said break-wheel to the other elements of the system is one of the important novel features of my invention, as set forth more particularly in claims 1 and 2. The other novel combinations are set forth in the remaining claims.

In order to illustrate the practical manner of carrying out the invention, and to enable others skilled in the art to which the invention appertains to make and use the same, drawings are hereunto annexed and described, in which similar letters represent corresponding elements, and in which each part referred to is designated by a single character.

Referring to the drawings, Figure 1, Sheet 1, is a front elevation of my improved fire-alarm device with the door of the inclosure or case containing the operating parts thrown open to uncover the electro-magnets with their armatures, the break-wheel, testing circuit-closers, &c.; Fig. 8, Sheet 3, a front elevation of some of the central parts within the case, viewed in the direction in which Fig. 1 is seen drawn to a slightly larger scale, the break-wheel being removed to show the parts beneath, a part of the frame holding the clock-work being broken away, parts of the frames holding the electro-magnets being shown in place, and the break-wheel represented by a dotted circle, some of the shafts of the clock-work and frame being transverse sections, as on the dotted line $z$ in Fig. 9, the parts being viewed as indicated by arrow in said Fig. 9.

Referring to the parts, A is the case or inclosure, preferably made of metal, containing the various working parts of the device, and B the door thereof, held by hinges in the ordinary manner.

C is the break-wheel.

D are electro-magnets arranged concentrically and radially around the break-wheel, being equally spaced, the frames $b$ of said magnets being held by screws or otherwise to the back-plate of the case.

E is an electro-magnet for controlling the escapement of the clock-work.

F is the frame for holding the clock-work beneath or back of the break-wheel.

G and G' are two devices for short-cutting certain of the circuits.

H are circuit-closers for the wires of the sections or various secondary systems of the different stories of the building.

K is an electric generating-battery, and L an alarm-bell of usual form and kind.

$d$ is the frame holding the electro-magnet E, and $a$ is the armature for the magnet.

$c$ is the pointed break lever or arm to act against the notched edge of the break-wheel, held by an insulating-block, $e$, secured to the frame F.

$r$ is an arm reaching out from the shaft of the break-wheel, which serves to operate the slide for the opening $v$ in the case through which the annunciator is read.

$i$ are the armatures for the electro-magnets D, which overhang at their free ends the break-wheel C, and operate at times to stop the motion of said wheel.

$b'$ is the driving-spring for the train of clock-wheels $a'$, $a^2$, and $a^3$, and the escapement $f$, all of which are of common kind, the said spring serving to turn the break-wheel C, which is secured to the shaft $h$, to which said spring is attached.

$k$ is a stud fixed rigidly to the break-wheel C, which, as said wheel is turned in either direction, encounters the post $c^6$, passing through the frame F, serving to prevent said break-wheel from being turned more than a single revolution.

The driving-spring $b'$ is strained or wound up by an ordinary key placed upon the squared end of the shaft $h$, the shaft being turned through one revolution, as above stated.

Figure 1:
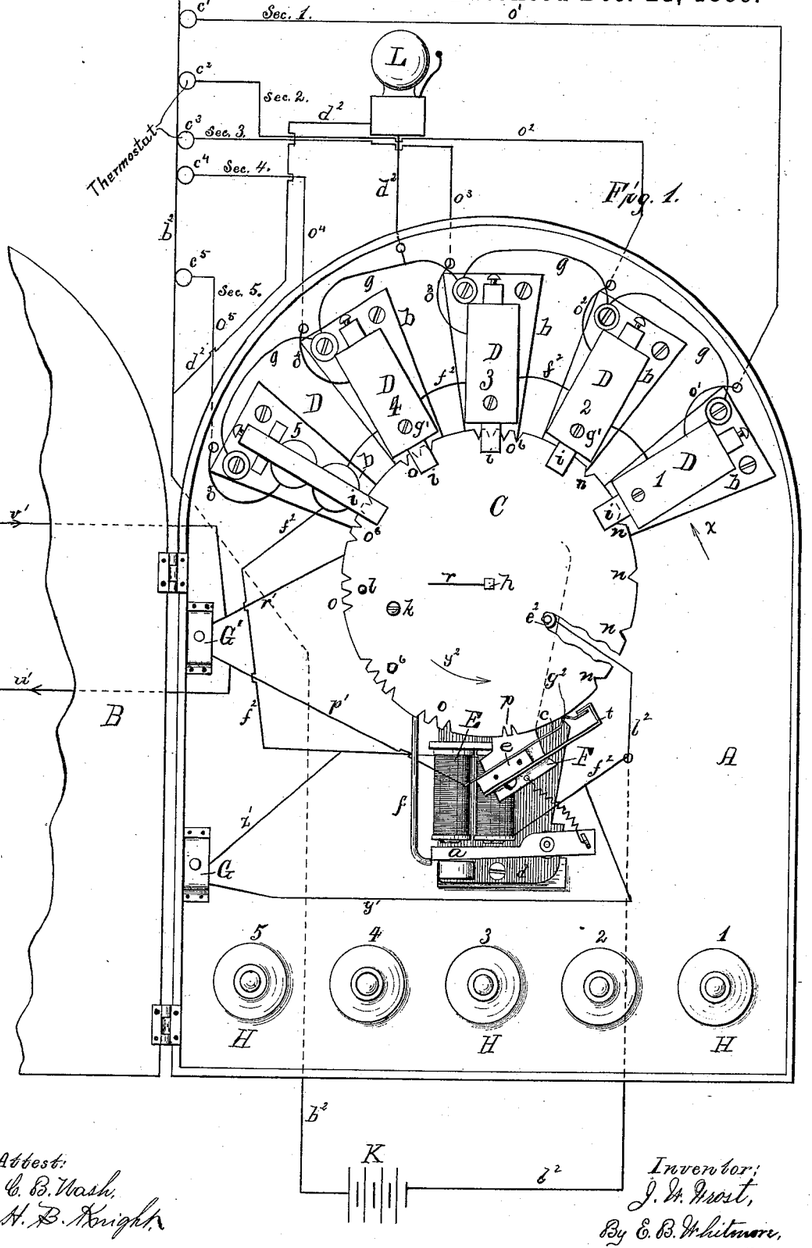

Passing a current through the magnet E draws up the armature $a$ (which forms a detent for the escapement $f$) and allows the clock-work to move, all in the ordinary manner, carrying the break-wheel C slowly around in the direction indicated by arrow $y^2$ in Fig. 1.

The periphery of the break-wheel is notched, so that a stroke shall be given upon the alarm-bell at the central office each time a notch passes the point $g^2$ of the arm $c$. At $o$ groups of three notches each are regularly cut in the wheel, alternated by groups $o^6$ of four notches each, regularly cut, there being blank spaces for pauses between the adjacent groups, so that the strokes upon the bell will indicate the number "34," the number of the groups being such that the number 34 is sounded three times in succession. The notches, however, may be grouped so as to cause any other number than 34 to be sounded, and repeated, as desired, more or less times. After these groups of notches there come single notches $n$, equally spaced, which are to cause the bell to strike to indicate the number of the particular story or section of the building at which danger exists, which stories or section are numbered, for instance, from 1 to 5. Two notches, $p$, are formed in the wheel, relatively in such a position that when the wheel starts they will reach the contact-point $g^2$ first and cause two strokes in quick succession upon the bell before the number of the building (34) is sounded. These two quick strokes are to give a preliminary alarm at the central office or elsewhere that a regular alarm of fire or danger is about to be sounded upon the bell, so that due notice may be taken thereof. This I consider of great importance, for if the attention of persons is not in some way thus called, the first number, suddenly and unannounced struck by the bell, is apt to be lost or only a part of the strokes counted, which is apt to lead to confusion and uncertainty as to the number struck.

The five electro-magnets D, equally spaced around the upper part of the break-wheel, are each electrically connected with one of the five stories or sections of the building supplied with the system of fire-alarm. These magnets are so placed that the ends of their respective armatures $i$ reach over the face of the break-wheel, so that when either one is brought down by its magnet it will just clear the surface of the wheel. A projecting pin, $l$, Figs. 1 and 2, from the surface of the wheel, is of such length and so placed that it will pass under the armatures $i$ without touching them, as the wheel turns upon its bearings when they are unaffected by the magnets; but if either of said armatures be brought down by its magnet it will stand in the way of and be encountered by the pin, serving to stop the rotation of the wheel. The magnet D and the magnet E are connected with and operated by the local battery K, so that upon the closing of any of the circuits operated by said battery by a thermostat in any part of the building the clock-work will be set in motion and simultaneously, by an armature of a magnet, D, will be brought down in position to receive the projection $l$ and stop the motion of the wheel, as above stated. The magnets D are all joined as in one by a wire, $g$, secured to the frames $b$ of each.

One pole of the battery K is joined to the clock-work at $e^2$ by means of the wire $l^2$, and the other pole of the battery is joined to the frames $b$ of the magnets D by means of the wires $b^2$, $d^2$, and $g$, as shown, on account of which the pin or projection $l$ of the break-wheel and the armatures $i$ of the magnets D are oppositely electrified and a circuit is formed when said pin touches either of said armatures, the local bells L being included in said circuit. The break-wheel C and arm $c$ are also oppositely electrified by an outside battery operating the line-wires, the currents of which move along the wires $v'$ and $u'$, the wire $r'$ being connected with the clock-work, and the wire $p'$ being connected with the arm $c$, as shown.

The apartments of the sections of the building supplied with systems of wires are to be furnished with thermostats—such as shown in the pending application of Frost and Lake, Serial No. 185,474—or other sensitive circuit-closures, by means of which, when any undue heat occurs in any of said apartments, the circuit will be closed and an alarm sounded. The projection $l$ notches in the break-wheel, and magnets D are relatively so arranged with each other and with the contact-point $g^2$ that when said wheel begins to turn the precautionary strokes will be given, the number of the building struck, and at least one notch $n$ will pass the contact-point, giving its stroke upon the bell before the first of the armatures $i$ is reached by the pin $l$, and the motion of the wheel stopped. These operations of the parts are effected by the closing of a circuit including the system of wires and apparatus belonging to any one of the sections of the building.

The spaces between the notches $n$ and the distances between the armatures $i$ are such that before the pin $l$ reaches the armature of magnet number 1 one notch $n$ will pass the joint $g^2$, giving a single stroke upon the bell at the central office, following the strokes indicating the number of the street or building. Before said pin arrives at the armature of magnet number 2 two notches $n$ will pass the joint $g^2$ and cause two single strokes to be given upon the bell, and so in each case a number of single strokes will be given upon the bell at the central office on account of the notches $n$ passing the point $g^2$ corresponding to the number of the magnet the armature of which interrupts the motion of the pin and break-wheel. There is a magnet for each section of the building, the several magnets being respectively included in the circuits of said sections, the wires of the several sections, numbering from 1 upward, being joined to the magnets in the order in which pin $l$ passes them as it is carried around by the break-wheel. For instance, the magnet first reached by the pin $l$ is numbered 1, and is joined to the wires of section number 1. The next magnet reached by the pin is numbered 2, which is joined to the system of the second section, and so on to the last. From this it will be seen that in each case the number of single strokes upon the bell—that is, the number of strokes caused by the single notches $n$ before the wheel is stopped by an armature—will correspond to the number of the magnet to which said armature belongs and to the number of the section, thus counting or pointing out the exact section of the building at which the cause exists for the alarm. For instance, if a thermostat close the circuit in section 3, the armature of the magnet D, number 3, would be brought down to stop the pin $l$. Before the latter reached the armature, however, three single strokes would be given the bell at the central office after the number of the building had been sounded, informing the attendant that the cause of the alarm was in section number 3 of the building.

The normal position of the wheel C when set for action is shown in Fig. 1. When the escapement $f$ is released by the armature $a$ and said break-wheel starts around, the precautionary alarm, the number of the building repeated, and the number of the section in which the cause of the alarm exists, will in each case be struck in the succession enumerated before the motion of the wheel is interrupted, as stated.

The local bells L are not inclosed in any of the circuits of the sections of the building, and as a consequence are not rung while the break-wheel C is turning and sending in the various alarms, as above described. When a circuit is closed by a thermostat which serves to start the clock-work, the magnet E and the magnet D belonging to the closed circuit remain active until the pin $l$ reaches the armatures of said magnet D and interrupts said circuit by short-cutting through the smaller circuit by way of the bell L. This throws the whole force of the battery on said bell, and causes it to ring after the other alarms have been sent in to the central office. The bell or bells L are purposely left out of the circuit controlling the operation of the break-wheel, so that their actions shall not interfere with the action of any of the parts within the case A during the sounding of the alarm at the central office.

The projection $l$ serves another purpose. If for any reason the armature $i$ is not drawn down sufficiently to stop the wheel C, yet if it merely touches it the current will pass from $l$ to $i$, and thus ring the bell L and also short-circuit the magnet E. The armature $a$ therefore drops and stops the wheel. The stopping of the wheel is therefore not dependent upon $l$ as a mechanical stop alone, but as what might appropriately be termed an "electric" stop. A wire, $f^2$, leads from the battery-wire $l^2$ through helix of the magnet E, thence through the frames $b$ of the magnet D, being insulated from said frames, the helices of said magnets D being each joined to said wire $f^2$. From the other ends of the respective helices of said magnets wires $o'$, $o^2$, $o^3$, $o^4$, and $o^5$ lead to the respective sections 1, 2, 3, 4, and 5 of the building, as shown, each being coupled in open circuit to the main battery-wire $b^2$ by numerous thermostats, $c'$, $c^2$, $c^3$, $c^4$, and $c^5$.

In the application for Patent No. 185,474, above referred to, there was shown and described an arrangement of devices for preventing the sending in of false alarms to the central office. The arrangement of the parts shown in this application perform the same function. Upon the edge of the break-wheel, between the notches $p$ and the notches $n$ nearest thereto, there is a blank of some length, which has to be traversed by the point $g^2$ of the arm $c$ as the wheel moves round before any alarm whatever can be sounded. On this account any momentary closing of the circuit at a thermostat, or otherwise, will be passed in silence, no alarm being produced until the circuit is closed sufficiently long continuously to carry the cluster of notches $p$ to the point $g^2$ of the arm $c$, excepting that a great number of successive momentary closings of the circuit would bring said notches $p$ to the point of the arm $c$ aforesaid.

Aside from causing to be given a precautionary alarm, as above described, the small notches $p$ also, by giving an alarm, serve to notify the attendant that the said cluster of notches $o$ are being brought around dangerously near to the circuit-breaker from unseen causes, such as the accidental momentary closings of the circuit above mentioned.

Figure 4:
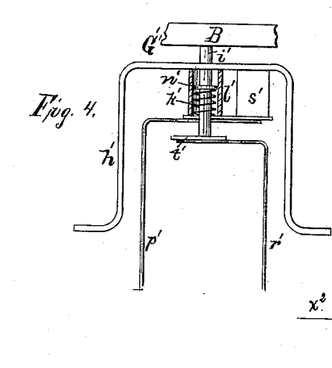
Fig. 4 shows an automatic circuit-breaker, one or more of which are inclosed in the case for the purpose of short-cutting the circuit at times when necessary, the same being drawn to a much larger scale than when shown in Fig. 1.

The devices G and G', Figs. 1 and 4, for opening and closing the circuits, are substantially the same as those shown in the pending application, Serial No. 185,474. They each consist of a frame, $h'$, secured within the case A, said frame holding a longitudinal pin, $i'$, which projects sufficiently far to be encountered and pushed back by the door B of the case when it is swung shut. A spiral spring, $k'$, encircling the pin, within a tube, $l'$, through which said pin passes within, tends to urge the pin in a direction out of the frame $h'$ by pressing upon a collar, $n'$, of said pin. When the pin is thus forced out, it electrically connects the two wires $p'$ and $r'$, for instance, while the closing of the door presses the pin back and breaks the connection.

$s'$ is an insulating-block secured to the frame $h'$, to which block the wire $p'$ is attached, and the pin has a metallic head, $t'$, to which the wire $r'$ is secured, which head comes in contact with said wire $p'$ when the door is opened and the spring forces the pin outward. To the wires $p'$ and $r'$ are attached the wires $u'$ and $v'$, respectively, going to and returning from the central office, which course the current takes as long as the wires $p'$ and $r'$ remain separated, which is all the time during which the door of the case A is closed; but the opening of the door connects the wires $p'$ and $r'$, as stated, and short-cuts the circuit at G', leaving out the wires $u'$ and $v'$. The circuit-breaker G is in every way like the one shown at G', the wires $y'$ and $z'$ of the former corresponding to the wires $p'$ and $r'$ of the latter. The wires $y'$ and $z'$ connect, respectively, with the wire $f^2$ on either side of the magnet E, which wires $y'$ and $z'$, when joined at G, serve to cut said electro-magnet out of the circuit.

Figure 5:
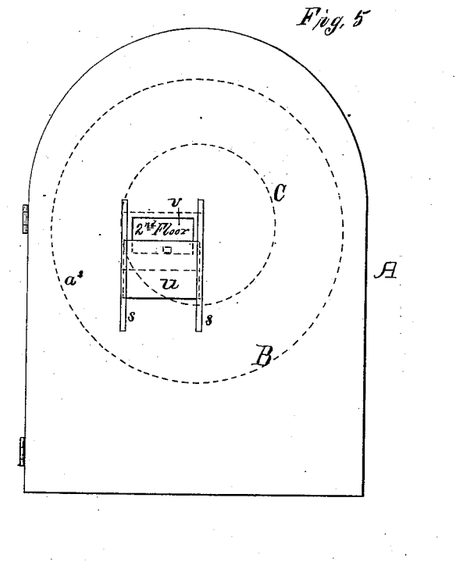
Fig. 5, a front view of the case, drawn to a smaller scale than shown in Fig. 1, the figure being drawn to show the opening through which to read the annunciator.
Figure 6:
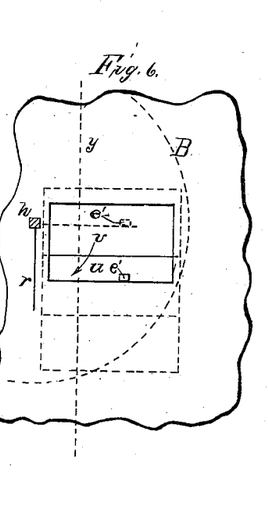
Fig. 6, a view of a portion of the front plate of the case, showing the opening therein drawn to a larger scale, the figure being drawn to show the manner in which the cover for the opening is automatically operated by the moving parts within the break-wheel, as in Fig. 5, being represented by a dotted circle, parts being shown in two positions by full and dotted lines, the shaft of the break-wheel being sectioned, as on the dotted line $h^2$ in Fig. 7.

The numbers of the sections or stories of a building supplied with this system of fire-alarm apparatus are painted or marked upon the side of the break-wheel in such positions that when the motion of the latter is stopped at any point, as above stated, the corresponding number of the story or section may be read through the opening $v$ in the door of the case, as shown in Fig. 5.

The invention is not limited to the precise construction hereinbefore described and shown, as it is evident that many modifications may be made therein without departing from the spirit of the invention.

Figure 7:
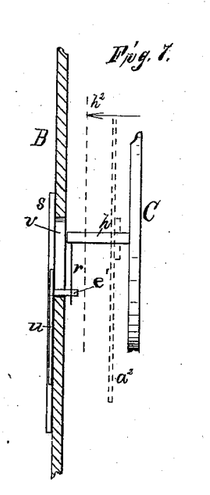
Fig. 7, a view of the parts shown in Fig. 6, viewed as indicated by arrow $x^2$ in said latter figure, drawn to show more fully the relation of the parts, the front plate of the case being sectioned, as on the dotted line $y$ in Fig. 6.
Figure 8:
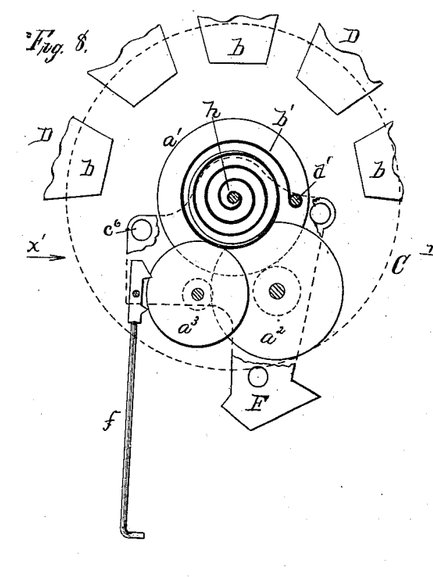
Figure 9:
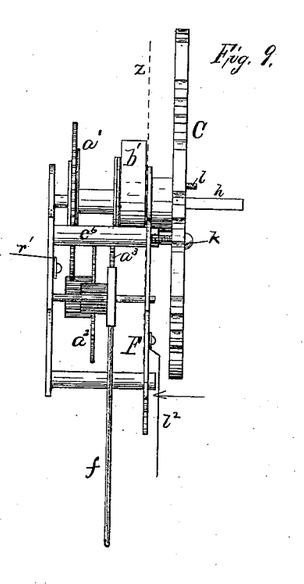
Fig. 9, an edge view of the central parts under the break-wheel, seen as indicated by arrow $x'$ in Fig. 8, drawn to further show the form and relation of said parts.
Figure 10:
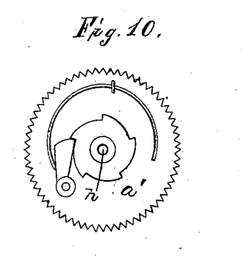
Fig. 10, a side elevation of the main toothed wheel secured to the spring-shaft, drawn to show the ratchet, pawl, and spring for the latter, which are of common form.
Figure 11:
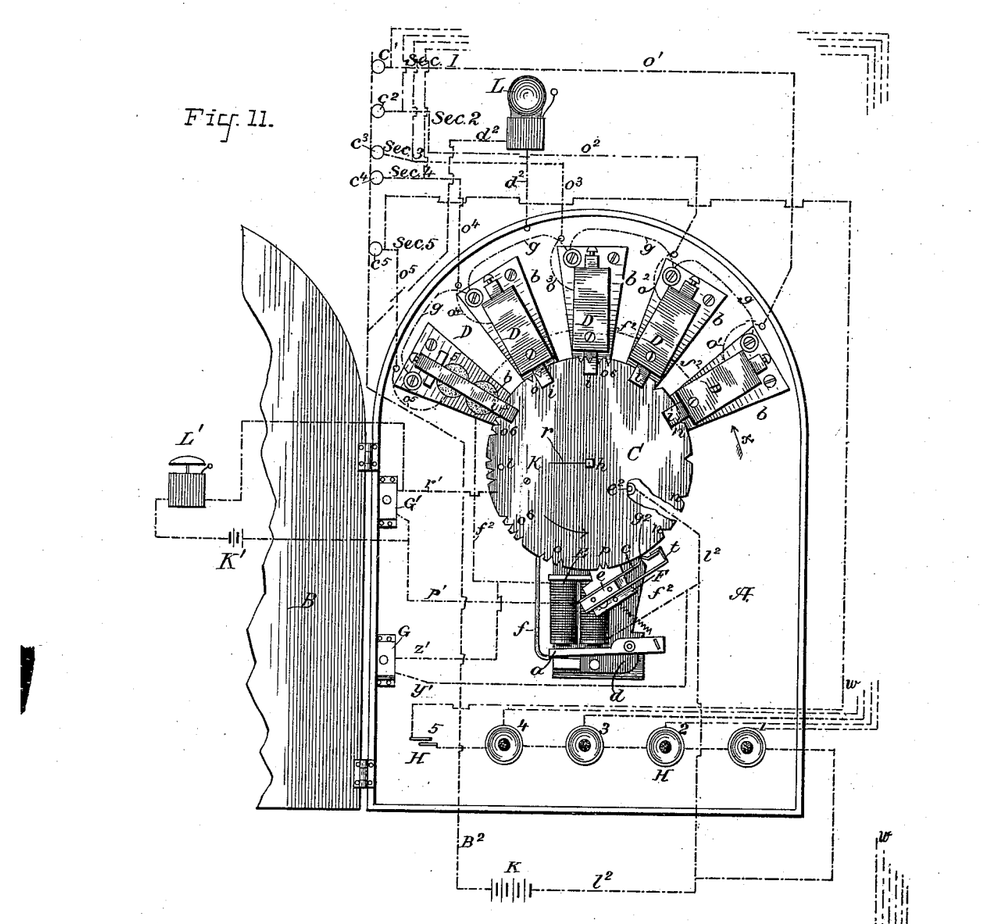
Fig. 11 is similar to Fig. 1, except that push-buttons near the bottom of the figure, and numbered 1 2 3 4 5, are represented in circuit. One, No. 5, of the push-buttons is shown as to its internal nature. Further, the circuits are represented in this figure by alternate dashes and dots, to prevent confusion with other lines of the drawings, and some of the parts are shaded. A bell, L', and battery K' are shown in circuit with the device G'.
Figure 12:
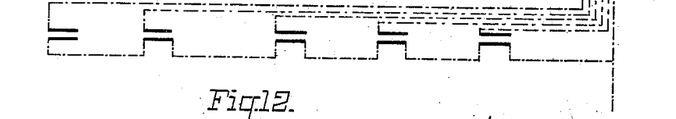
Fig. 12 shows all the push-buttons in circuit in diagram in parallel, so that by closing any one the circuit is closed.

It may be desirable to place a disk, $a^2$, (shown in dotted lines in Fig. 7,) of sheet metal or pasteboard, upon the shaft $h$, of larger diameter than the break-wheel C, in front of the latter, to enable me to put the numbers of the stories or sections upon the same in larger characters, to be more easily read, in which case the opening $v$ through the door of the case would have to be much larger in proportion than shown, and nearer the side of the door next the hinged joint. This case A is designed to be made of metal, well protected from the weather, and placed out of doors, to be seen and have the clock-work reset by persons upon the street. On account of its being exposed to the weather, I provide a sliding cover, $u$, to close the opening $v$, except when it becomes necessary to read the section upon the wheel or disk after an alarm has been sounded. This cover for the opening $v$ is fitted to move in vertical slides $s$, fixed upon the exterior of the door. It is arranged to fall by gravity, but is held up automatically by an arm, $r$, reaching outward from the shaft $h$, under a stud, $e'$, projecting inwardly from a face of said cover, as shown. When the wheel C commences to move around, it allows the cover to gradually drop to uncover the opening. In turning the wheel backward with the key, as above stated, to reset it after an alarm has been sounded, the arm $r$, catching under the stud $e'$, lifts the cover to its place over the opening, where it is held until another alarm is sounded.

It is preferred to place the case upon the outside of the wall of the building, that it may be at all times accessible, so the systems of the sections of the building may be at any time tested by the insurance agents or others interested in the safety of the building and its contents.

Figure 2:
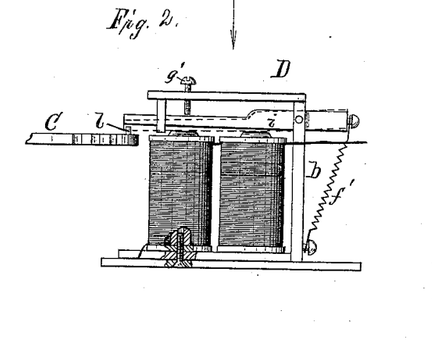
Fig. 2, Sheet 2, a side elevation of one of the electro-magnets held within the case, and the frame holding the same, drawn to a larger scale and viewed as indicated by arrow $x$ in Fig. 1, parts being broken away and sectioned to show the manner of attaching the parts together, a part of the break-wheel being shown under the end of the armature, the latter being shown in two positions by full and dotted lines.
Figure 3:
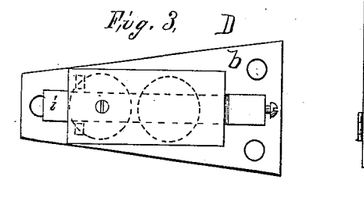
Fig. 3, a view of the electro-magnet and frame, seen as indicated by arrow in Fig. 2.

The armatures $i$ are held normally away from the break-wheel, and the respective magnets, where the latter are inactive, by slender spiral springs $f'$, Fig. 2, attached to their outer overhanging ends and to the frames. Set-screws $g'$, through the upper plates or parts of the respective frames, serve to determine the upward movements of the armatures as effected by the springs $f'$.

The device here shown is designed to form a part of the automatic fire-alarm system shown and described in the application Serial No. 185,474. The same style of circuit-closers H, shown and described in said application for testing the various systems of apparatus within the building, are designed to be employed in this invention, there being one for each section that is provided with an independent system of fire-alarm apparatus. A wire connection is made between the several push-buttons or circuit-closers and the respective sections, so that a current may be sent through the entire apparatus of either section by closing the circuit at the push-button corresponding to the section in number. These push-buttons are inclosed in the case A, with the clock-work and magnets, so that they cannot be operated while the door of the case is closed and while the circuit to the central office is closed. The opening of the door cuts out the wires leading to the central office by short-cutting the circuit at G', as above described. The opening of the door also makes a short connection at G, cutting out the magnet E. From this the tests of the systems can be made without starting the clock-work or alarming the central office.

The clock mechanism may be wound up by a suitable key and the instrument tested without any danger of giving an accidental or unintentional alarm, as the springs or switches at G and G' serve to cut out the wires $z'$ and $y'$ and $v'$ and $u'$ when the door of the instrument is opened. If the spring or switch cutting out the trip-magnet is pressed in and the circuit be closed by means of either of the push-buttons, the clock-work will be released without sending in an alarm to the engine-house, thus affording means for testing the trip mechanism and clock-work, and if the other spring be pushed in also, and the circuit thereby closed, a single stroke or test signal can be given at the engine-house. All these tests may be made from the box, which may be located upon the outside of a house in reach of an inspector.

Having now stated the title, object, and nature of the said invention, having described its practical realization by reference to the accompanying drawings, and having particularly ascertained the manner in which the same operates to accomplish the said object, what I claim is—

1. In an electric-alarm system, the combination, with circuit-controlling mechanism in circuit with receiving apparatus at a distant or central station, of releasing devices for the said circuit-controlling mechanism, and electro-magnetic detent devices therefor, and circuit-controllers located in different sections of a hotel or other structure to be protected, the said circuit-controllers being in circuit with the said electro-magnetic detent devices, substantially as and for the purposes set forth.

2. In an electric-alarm system, the combination of an electric circuit, including, first, a normally-open electric thermostat in the section of a building; secondly, an electric generator; thirdly, a clock-work electro-magnetic releasing device, and, fourthly, an electro-magnetic stopping device and a circuit-breaking wheel in said building, and in an independent signal-circuit normally closed, the said wheel being geared to said clock-work, and the said stopping device being provided for said wheel, substantially as and for the purpose described.

3. In an electric-alarm system, the combination of electric thermostats or similar circuit-closers located at different sections of a structure—such, for instance, as a house or hotel—a circuit-breaking wheel and electro-magnets in circuit, respectively, with said circuit-closers, and provided with armatures adjacent to said wheel, which has a projection of such length as normally to pass said armatures without touching them, all located in a noticeable position in said building—such, for instance, in the office of a hotel, or upon the outside of the building—and an electric bell or similar signal located at a distant station—such as an engine-house or fire-tower—and in circuit with said circuit-breaking wheel, the said magnets and said signal being in independent circuits, substantially as and for the purpose described.

4. In an electric-alarm system, the combination, with a moving circuit-controlling mechanism provided with a stop or projection and in circuit with receiving apparatus at a distant or central station, of an electro-magnet in a distinct circuit, the armature of said magnet being normally held out of the path of the said stop or projection, but being adapted to be drawn into the path of the said stop or projection when the condition of the magnet-circuit is changed, and the said electro-magnet having in its circuit a circuit-controller, substantially as and for the purpose set forth.

5. In an electric-alarm system, the combination of a series of electro-magnets connected respectively by electric conductors with independent systems of alarm devices, a rotating break-wheel formed with notches to correspond in number to the number of said systems, a contact-point for said wheel, a projection of said wheel to encounter the armatures of said magnets, and a current-generating battery, the said alarm devices being located in sections of a building—such as a hotel—and the break-wheel and the other-named elements at any convenient position in or near said building, substantially as and for the purpose described.

6. In an electric-alarm system, the combination of a normally-closed electric circuit, including a continuous current-generator, a circuit-breaking wheel provided with notches upon its periphery, a contact-point which presses upon said wheel, and an electric signal, the said notches being of two kinds—the one for giving an attention or warning signal and the other for giving the alarm proper—and a second circuit normally open and including an electric-generator, an automatic circuit-closer, an automatic electro-magnetic stop for said wheel, and an automatic electro-magnetic clock-releasing device for said wheel, substantially as and for the purpose set forth.

7. In an electric-alarm system, the combination of a normally-closed electric circuit, including a continuous current-generator and electric signal located at one station, a circuit-breaker located at a second station, a second circuit normally open and containing a second generator, an electro-magnetic releasing device for said circuit-breaker, which is geared to clock-work normally tending to propel said circuit-breaking wheel, an electro-magnetic stopping device for said circuit-breaker, and an automatic circuit-closer located at a third station and a third circuit located at the said second station and including a second electric signal—such as a bell—and normally open through the said circuit-breaker, and including, also, the said second generator, substantially as and for the purpose described.

8. In an electric-alarm system, the combination of a circuit-breaking wheel provided in the order named with notches for giving an attention-signal, with other notches for giving an alarm indicating a number—such as that of a building—and with still other notches for giving another number—as of a section of said building—an automatic electro-magnetic releasing device for said break-wheel, which is geared to clock-work normally tending to propel said wheel, and an independent electric stopping device for said wheel, both the releasing and stopping devices being located in the same circuit normally open, and the said wheel being in a separate circuit normally closed, substantially as and for the purpose described.

9. In an electric-alarm system, a moving circuit-breaking wheel provided with notches for giving a precautionary alarm, with other notches for giving an alarm indicating a number, and still other notches to indicate a second number, and with a projecting contact-point or electrode for short-circuiting an electro-magnetic device which has an operating connection with a stop for checking the motion of said wheel, the said electrode being in circuit with a movable electrode which has an electro-magnetic operating connection with an electric thermostat, substantially as described.

10. In an electric-alarm system, the combination of a moving circuit-breaking wheel provided with three sets of notches for giving three corresponding and distinct alarms, and with a projection in a normally-open circuit including a circuit-closer, said wheel, and an electro-magnetic stop for said wheel independent of said projection, the said electro-magnetic stop being in a short circuit to said projection, and an electric bell or similar signal located in a circuit normally open through said projection, substantially as and for the purpose described.

11. In an electric-alarm system, the combination of an electric generator, an automatic rotating or moving circuit-breaker, and a stop for said circuit-breaker held to be encountered by a projection thereof, said circuit-breaker and said stop being oppositely electrified by said generator, on account of which, when said projection of the circuit breaker and interrupter meet, a new circuit for the current is formed, substantially as and for the purpose described.

12. In an electric-alarm system, the combination of an electrified rotating break-wheel formed with notches, and a pin or projection, an oppositely-electrified contact point or arm for said break-wheel, by means of which, when said notches pass said point, alarms are given, in combination with a series of stops magnetically operated by separate circuits and provided for said break-wheel, which is held to be encountered by said projection, by means of which said wheel may be interrupted at different stages of its revolution to transmit different signals dependent upon the point at which it is so interrupted, substantially as described.

13. In an electric-alarm system, the combination, with a circuit-breaking wheel and an electro-magnetic releasing device therefor, of a series of electro-magnetic detents for the said wheel, located in independent shunt-circuits, and a series of open-circuit push-buttons, H, one in each of the shunt-circuits, including the electro-magnetic detents, an open-circuit push-button, G, in a shunt around the circuit-breaking wheel, and an open-circuit push-button, G', in a shunt around the electro-magnetic releasing device, whereby the system of circuits can be tested without releasing the circuit-breaking wheel, substantially as described.

14. In combination with the shaft $h$ of the electric-circuit-breaking wheel C, an arm or projection, $r$, extending therefrom, and a covering, $u$, over an opening, $v$, supported in slides and normally resting upon said arm, suitable characters or words being located behind said opening, substantially as and for the purpose set forth.

15. The combination, with a circuit-breaking wheel provided with notches to represent a definite signal, and a spring normally in contact with the said wheel, and an unbroken space between the point of contact and the first notch, of an electro-magnetic releasing device for the said wheel, the magnet of the said releasing device being operatively connected with the escapement which controls the movements of the wheel, and being also in circuit with one or more circuit-controllers—such as thermostats—whereby the spring will remain in contact with the wheel for a considerable period, and whereby the signaling mechanism will be operated only by an extended or a permanent change in the condition of the circuit, substantially as set forth.

16. The combination, with a circuit-controlling wheel provided with suitable releasing mechanism and with a series of detents capable of stopping the said wheel at different stages of its progress, of an opening in the casing in front of the said wheel, and an annunciating-disk operated by the movement of the wheel, so as to bring different signs or numbers in line with the said opening, whereby the reading at the said opening will always indicate at what point the progress of the disk has been interrupted, substantially as and for the purpose set forth.

17. In an electric-alarm system, the combination of a moving circuit-breaking wheel provided with two sets of notches for giving two corresponding and distinct signals, and with a projection in a normally-open circuit including a circuit-closer, said wheel, and an electro-magnet stop for said wheel independent of said projection, the said electro-magnet stop being in a short circuit to said projection, and an electric bell or similar signal located in a circuit normally open through said projection, substantially as and for the purpose described.

18. In an electric-alarm system, a moving circuit-controlling mechanism, and electro-magnetic detents located in independent circuits and arranged at different points along the path of the same, said detents being in circuit with a series of circuit-controllers, substantially as and for the purpose set forth.

19. In an electric-alarm system, the combination of a circuit-controlling mechanism, an electro-magnetic stop therefor, sections of a building—such as the floors of a house—and circuit-closers—such as electric thermostats—in said sections and having electrical connections with said stopping devices, said mechanism being in circuit with an electric signal at a distant station—such as at a fire-engine house—substantially as and for the purpose described.

20. In an electric-alarm system, the combination, with a circuit-breaking wheel and an electro-magnetic releasing device therefor, of a series of electro-magnetic detents for the said wheel located in independent shunt-circuits, a series of open-circuit push-buttons, H, one in each of the circuits including the electro-magnetic detents, and an open-circuit push-button, G, in a shunt around the circuit-breaking wheel, whereby the system of circuits can be tested without sending in an alarm, substantially as described.

21. In an electric-alarm system, a moving circuit-controlling mechanism, a releasing device therefor, and a series of detents for the same, by means of which said mechanism can be held or checked at different stages of its progress after release, whereby the same circuit-controller may be made to indicate different signals dependent upon the point where its progress is interrupted, substantially as set forth.

J. W. FROST.

Witnesses:
E. B. WHITMORE,
H. B. KNIGHT.